(12) United States Patent
Singh et al.

(10) Patent No.: US 11,996,933 B2
(45) Date of Patent: May 28, 2024

(54) METHOD AND APPARATUS FOR SELECTING MCS IN WIRELESS COMMUNICATION SYSTEM

(71) Applicant: Samsung Electronics Co., Ltd., Suwon-si (KR)

(72) Inventors: Abhishek Kumar Singh, Bengaluru (IN); Ekansh Gupta, Bengaluru (IN); Anshuman Nigam, Bengaluru (IN); Anil Agiwal, Suwon-si (KR); Pravjyot Singh Deogun, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 17/286,787

(22) PCT Filed: Oct. 17, 2019

(86) PCT No.: PCT/KR2019/013693
§ 371 (c)(1),
(2) Date: Apr. 19, 2021

(87) PCT Pub. No.: WO2020/080863
PCT Pub. Date: Apr. 23, 2020

(65) Prior Publication Data
US 2021/0376951 A1 Dec. 2, 2021

(30) Foreign Application Priority Data

Oct. 17, 2018 (IN) .............................. 201841039439
Oct. 31, 2018 (IN) .............................. 201841041100
Oct. 16, 2019 (IN) .............................. 201841039439

(51) Int. Cl.
*H04L 1/00* (2006.01)
*H04L 5/22* (2006.01)
(Continued)

(52) U.S. Cl.
CPC .......... *H04L 1/0003* (2013.01); *H04L 1/0009* (2013.01); *H04L 1/0022* (2013.01);
(Continued)

(58) Field of Classification Search
None
See application file for complete search history.

(56) References Cited

U.S. PATENT DOCUMENTS

2007/0218952 A1\* 9/2007 Koo ....................... H04B 7/043
455/562.1
2008/0285512 A1 11/2008 Pan et al.
(Continued)

FOREIGN PATENT DOCUMENTS

KR 20160147756 A 12/2016

OTHER PUBLICATIONS

Nokia et al., "Remaining details of CQI and MCS for URLLC", 3GPP TSG-RAN WG1 Meeting #92, Feb. 26-Mar. 2, 2018, R1-1802546, 7 pages.
(Continued)

*Primary Examiner* — The Hy Nguyen

(57) ABSTRACT

Accordingly, the embodiments herein disclose a method for selecting a MCS in a wireless communication system. The method includes receiving, by a UE, a list of default MCS from a base station. Further, the method includes measuring, by the UE, a CQI. Further, the method includes selecting, by the UE, at least one MCS from the list of default MCS based on the measured CQI.

9 Claims, 12 Drawing Sheets

(51) Int. Cl.
 *H04W 24/08* (2009.01)
 *H04W 72/21* (2023.01)
(52) U.S. Cl.
 CPC .............. *H04L 1/0025* (2013.01); *H04L 5/22* (2013.01); *H04W 24/08* (2013.01); *H04W 72/21* (2023.01)

(56) References Cited

U.S. PATENT DOCUMENTS

| | | | |
|---|---|---|---|
| 2010/0014500 A1* | 1/2010 | Lee | H04L 25/0202 370/342 |
| 2010/0290559 A1 | 11/2010 | Futagi et al. | |
| 2015/0195819 A1 | 7/2015 | Kwon et al. | |
| 2015/0312071 A1 | 10/2015 | Chen et al. | |
| 2015/0381310 A1* | 12/2015 | Hammarwall | H04L 1/0026 370/329 |
| 2017/0013565 A1* | 1/2017 | Pelletier | H04W 72/0473 |
| 2019/0103946 A1* | 4/2019 | Li | H04L 1/1887 |
| 2021/0126733 A1* | 4/2021 | Chen | H04W 74/004 |

OTHER PUBLICATIONS

Ericsson, "Text Proposal for MCS determination", 3GPP TSG-RAN WG1 Meeting #94, Aug. 20-24, 2018, R1-1809837, 5 pages.
Notification of Transmittal of the International Search Report and the Written Opinion of the International Searching Authority, or the Declaration dated Mar. 25, 2020 in connection with International Patent Application No. PCT/KR2019/013693, 14 pages.
Office Action dated Oct. 31, 2023, in connection with Korean Patent Application No. 10-2021-7014103, 11 pages.
Notice of Allowance issued Jan. 31, 2024, in connection with Korean Patent Application No. 10-2021-7014103, 5 pages.

\* cited by examiner

Figure 10

Define 4 slot restrictions: UL, DL, BOTH and NONE
Define 4 slot reservations: UL, DL, GUARD
Define minimum time-slot length for each type (UL/DL/GUARD) = S_UL, S_DL, S_GUARD
Define min_delay, max_delay, diff_delay and periodicity;
Define restricted area regions for each of the slot types (UL/DL/GUARD) based on the following:
    Restricted region due to DL slot at slot_position = from [slot_position + 2*m] to [slot_position + 2*M + S_DL]
    Restricted region due to UL slot at slot_position = from [slot_position - 2*M] to [slot_position - 2*m + S_UL]
    A GUARD slot introduces no restriction Define slot_position = 0;

Recursively as long as (slot_position != periodicity):

Based on the following conditions, add recursively a UL/DL/GUARD slot of defined length at slot_position with the defined periodicity;
    Conditions:
        DL slot compatible if slot_position == RESTRICT_NONE || slot_position == RESTRICT_UL
        UL slot compatible if slot_position == RESTRICT_NONE || slot_position == RESTRICT_DL
        GUARD slot compatible if slot_position == RESTRICT_NONE || slot_position == RESTRICT_DL || slot_position == RESTRICT_UL || slot_position == RESTRICT_BOTH Any of the compatible slots can be added;
    reserve the slot based on the type of slot added (UL/DL/GUARD);
    Restrict a region based on the added slot with the defined periodicity or tighten the restriction if region is already restricted;
    increment slot_position by defined slot length;
    if slot_position becomes equal to periodicity, restore the frame to the original value when the current recursive routine was called and return to the caller end Figure 11
An example DL heavy frame (many such frames are possible)
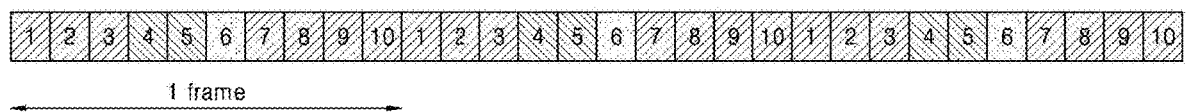
1 frame
An example UL heavy frame (many such frames are possible)
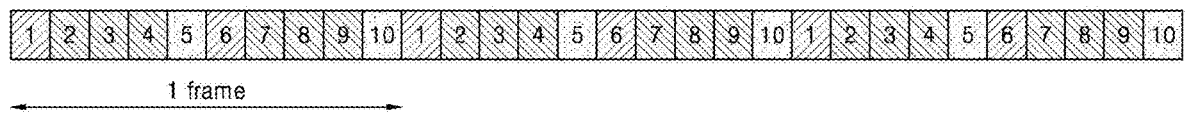
1 frame
▨ DL   ▨ UL   ▨ Guard time
Total Guard time in DL heavy frame = 1ms (2*D)
Total Guard time in DL heavy frame = 2ms (4*D)

METHOD AND APPARATUS FOR SELECTING MCS IN WIRELESS COMMUNICATION SYSTEM

CROSS-REFERENCE TO RELATED APPLICATIONS

This application is a 371 of International Application No. PCT/KR2019/013693 filed on Oct. 17, 2019, which claims priority to India Patent Application No. 201841039439 filed on Oct. 17, 2018, India Patent Application No. 201841041100 filed on Oct. 31, 2018, and India Patent Application No. 201841039439 filed on Oct. 16, 2019, the disclosures of which are herein incorporated by reference in their entireties.

BACKGROUND

1. Field

The present disclosure relates to a wireless communication system, and specifically related to a method and system for a Modulation Coding Scheme (MCS) selection for a new radio (NR) non-terrestrial network (NTN), and more specifically related to method and system for supporting Time division duplexing (TDD) frame in high propagation delay cells using a flexible frame structure in the new radio (NR) non-terrestrial network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

BRIEF DESCRIPTION OF THE DRAWINGS

This method, apparatus and system is illustrated in the accompanying drawings, throughout which like reference letters indicate corresponding parts in the various figures. The embodiments herein will be better understood from the following description with reference to the drawings, in which:

FIG. 10 illustrates a method to generate frames, according to the embodiments as disclosed herein;

FIG. 11 illustrates a sample DL-heavy and UL-heavy frames, according to the embodiments as disclosed herein;

DETAILED DESCRIPTION

Figure 1:
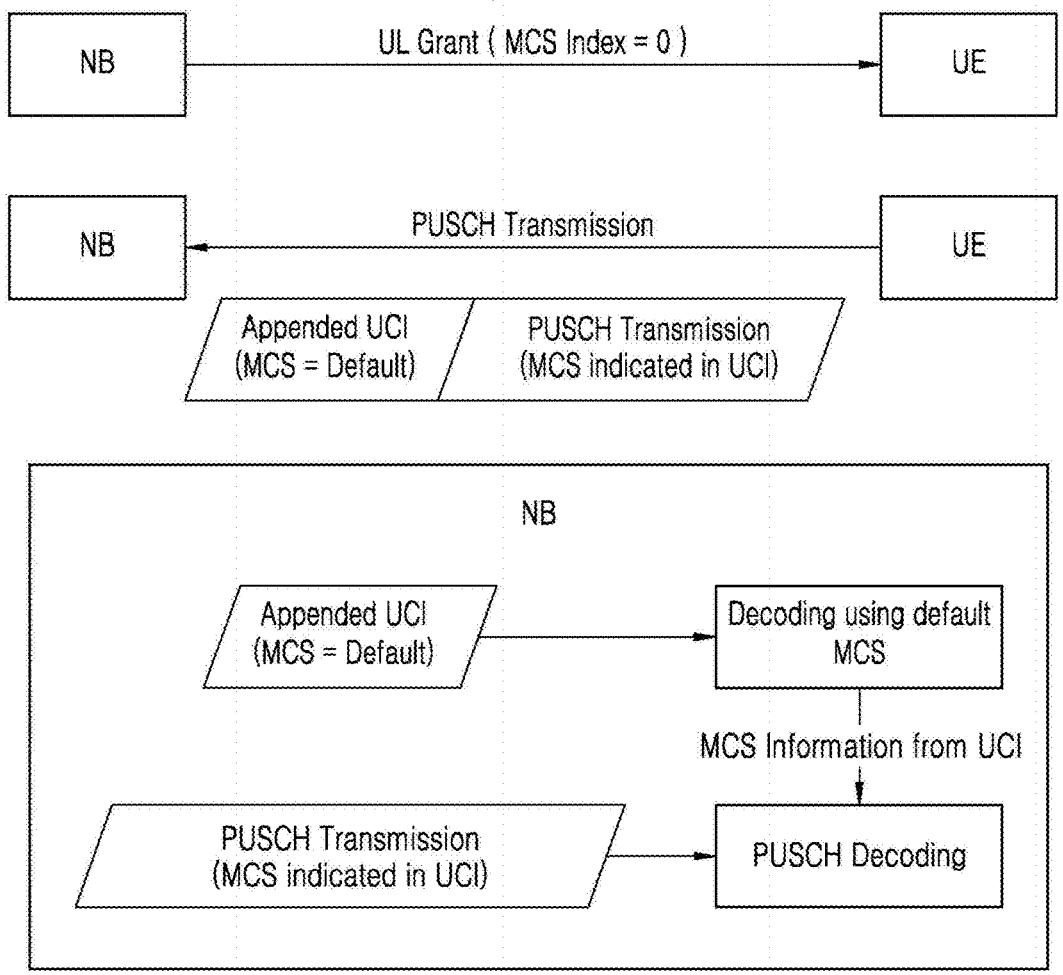
FIG. 1 is a schematic diagram illustrating an example for a solution based on a proposed method for selecting a MCS in a wireless communication system, according to the embodiments as disclosed herein.

Accordingly, the embodiments herein disclose a method for selecting a MCS in a wireless communication system. The method may include receiving, by a UE (user equipment), a list of default MCS (Modulation Coding Scheme) from a base station. Further, the method may includes measuring, by the UE, a CQI (Channel Quality Indicator). Further, the method may includes selecting, by the UE, at least one MCS from the list of default MCS based on the measured CQI.

In an embodiment, further, the method may include indicating, by the UE, the at least one MCS along with a packet in a control channel to the base station.

In an embodiment, the at least one MCS along with the packet may be indicated in the control channel to the base station using an UCI (Uplink Control Information).

In an embodiment, the UE may be append the UCI to an intended PUSCH (Physical Uplink Shared Channel) transmission using at least one default MCS from the list of default MCS for the UCI, if the PUSCH transmission is used to send the MCS to the base station.

In an embodiment, the UE may receive the list of default MCS from the base station via at least one a DCI (Downlink Control Information) message, a RRC(Radio Resource Channel) Message, and a MAC CE (Medium Access Control Control-Element) message for a UCI transmission.

In an embodiment, selecting, by the UE, MCS based on the measured CQI may include determining that a measured CQI is not matching with a predefined CQI using the mapping table, and selecting the MCS based on the determination.

In an embodiment, the CQI may be measured using at least one of a channel history, an instantaneous channel, a channel usage experience and a machine learning procedure.

In an embodiment, the UCI may include an index associated with the MCS in a packet, wherein the index is the index in the ordered MCS list sent by the base station.

In an embodiment, the UCI may include at least one a control bit followed by an index associated with the MCS in a packet.

In an embodiment, a control bit may be needed to inform the base station that a PDSCH (Physical Downlink Shared Channel) is appended with the UCI when the UCI is appended to the PDSCH.

In an embodiment, the at least one default MCS may correspond a first MCS in a most recent list of the default MCS transmitted by the base station.

In an embodiment, the UE may use a most recent received MCS list or a first received MCS from the base station, if the control channel for an uplink data channel does not indicate the at least one MCS or the list of MCS to the UE.

In an embodiment, the UE may do not need to indicate the first MCS back to the base station, when the UE uses a first MCS from the list of default MCS.

In an embodiment, the UE may select a MCS and signals index associated with the MCS used in a UCI to the base station, if the UE determines that none of the MCS given by the base station in the default MCS list are suitable.

Accordingly, the embodiments herein disclose a method for selecting a MCS in a wireless communication system. The method may include sending, by a base station, a list of default MCS to a UE. Further, the method may include receiving, by the base station, at least one MCS, from the list of default MCS, along with a packet in a control channel from the UE using a UCI.

In an embodiment, further the method may include decoding, by the base station, the UCI containing the at least one MCS, and decoding, by the base station, a PUSCH using the at least one decoded MCS.

In an embodiment, further the method may include determining, by the base station, that the PUSCH is not able to decode using the at least one decoded MCS, and performing a fallback to the default MCS.

In an embodiment, the base station may send the list of default MCS to the UE through at least one a DCI message, an UCI, a RRC Message, and a MAC CE.

In an embodiment, the base station may consider that UE has used a first MCS from the list of default MCS, if the base station does not receive the MCS used from the UE.

In an embodiment, the base station may receive an index associated with a MCS used in a UCI from the UE, if the UE determines that none of the MCS given by the base station in the default MCS list are suitable.

Accordingly, the embodiments herein disclose a method for selecting a MCS in a wireless communication system. The method may include receiving, by a UE, a list of MCS indicated in a DCI message. Further, the method may include decoding, by the UE, a PDSCH using the at least one MCS indicated in the DCI.

In an embodiment, the UE may utilize the MCS indicated in a grant to decode the PDSCH, if the base station has indicated the MCS information in the grant and the DCI associated with the PDSCH does not contain the MCS information for the PDSCH transmission.

In an embodiment, the UE may utilize a default MCS configured for a HARQ process to decode the PDSCH, if the base station has not indicated MCS information in a grant for the first PDSCH transmission corresponding to a HARQ process and no DCI indicating MCS information for the PDSCH transmission is decoded.

In an embodiment, the UE may use a most recent received MCS list or a first received MCS from the base station, if a control channel for a downlink data channel does not indicate the at least one MCS or the list of MCS to the UE.

Accordingly, the embodiments herein disclose a method for supporting a TDD (Time Division Duplex) frame in a high propagation delay cell using a frame structure in a wireless communication system. The method may include configuring, by a base station, a frame structure based on a minimum delay associated with a cell, maximum delay associated with the cell, differential delay associated with the cell and a slot length. Further, the method may include controlling, by the base station, a guard time based on the minimum delay associated with the cell, the maximum delay associated with the cell, the differential delay associated with the cell and the slot length. Further, the method may include supporting, by the base station, the TDD frame based on the guard time. A downlink transmission and an uplink transmission are not allowed in the guard time.

In an embodiment, controlling the guard time based on the minimum delay associated with the cell, the maximum delay associated with the cell, the differential delay associated with the cell and the slot length may include defining at least one region using a mathematical relation, wherein the at least one region is restricted for at least one of an UL and a DL based on at least one neighboring UL slot and a DL slot, and controlling the guard time based on the at least one defined region.

In an embodiment, the slots that are to be used as guard time may be computed by defining the restriction regions as, for Downlink: X+2*(minimum propagation delay) to X+2* (maximum propagation delay)+slot length, that does not have an uplink slot and for uplink: X−2*(maximum propagation delay) to X−2*(minimum propagation delay)+slot length, that does not have a downlink slot, where X is the start of a slot.

In an embodiment, the base station may send information about the guard time to a UE via at least one a MIB message, a SIB message and a RRC configuration.

In an embodiment, the base station may broadcast information about the frame structure via at least one of a MIB message, a SIB message, MAC Configuration and a RRC configuration to the UE.

In an embodiment, the frame structure may be configured based on at least one a throughput requirement of a cell, a throughput requirement of a beam, an average nature of UL-heavy or DL-heavy, a number of potential UEs, a maximum/Minimum/Differential propagation delay of the cell/beam area, latency requirements of certain specific UEs or services/applications, and specific delay profiles for a set of UEs within a specific range of heights.

Accordingly, the embodiments herein disclose a UE for selecting a MCS in a wireless communication system. The UE includes a processor coupled with a memory. The processor is configured to receive a list of default MCS from a base station and measure a CQI. Further, the processor is configured to select at least one MCS from the list of default MCS based on the measured CQI.

Accordingly, the embodiments herein disclose a base station for selecting a MCS in a wireless communication system. The base station includes a processor coupled with a memory. The processor is configured to send a list of default MCS to a UE and receive at least one MCS, from the list of default MCS, along with a packet in a control channel from the UE using an UCI.

Accordingly, the embodiments herein disclose a UE for selecting a MCS in a wireless communication system. The UE includes a processor coupled with a memory. The processor is configured to receive at least one MCS from a list of MCS indicated in a DCI message and decode a PDSCH using the at least one MCS indicated in the DCI.

Accordingly, the embodiments herein disclose a base station for selecting a MCS in a wireless communication system. The base station includes a processor coupled with a memory. The processor is configured to configure the frame structure based on a minimum delay associated with a cell, maximum delay associated with the cell, differential delay associated with the cell and a slot length. The processor is configured to control a guard time based on the minimum delay associated with the cell, the maximum delay associated with the cell, the differential delay associated with the cell and the slot length. The processor is configured to support the TDD frame based on the guard time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "base station" and NB are used interchangeably in the disclosure.

Currently in a NR, a base station (e.g., NB, or the like) decides MCS (Modulation Coding Scheme) to be used by/for a particular user equipment (UE) for an uplink (UL)/downlink (DL) transmission based on Channel Quality Indicator (CQI) reports provided by the UE and load. However, for systems where data transmission can get delayed (e.g. due to Listen Before Talk (LBT) Failure in NR Unlicensed) or systems where propagation delay is very large (e.g. NR NTN) the MCS information indicated in a grant can become inappropriate for the channel conditions at the time of actual transmission. Further, the CQI reports available with the NB might become obsolete and no longer correspond to current channel conditions if the propagation delay is of the order of coherence time of the channel. This can cause use of inappropriate MCS for transmission leading to frequent decoding failures, hence reducing the effective data rate and increasing the latency.

Further, TDD (Time division duplexing) is a cell access scheme prevalently used along with a FDD (frequency division duplexing) for scheduling time-frequency resources in a cell to multiple users. The FDD uses a fixed paired spectrum for DL and UL transmissions and hence the FDD cannot change the weightage of UL and DL transmissions that happen in a cell. The TDD on the other hand, schedules multiple users by allocating time-frequency resources by slicing those resources in time and frequency both. This allows for a more robust and flexible DL-UL configuration along with allocation of only one spectrum.

TDD mode is preferred for the following reasons:
1—It enables dynamic allocation of DL and UL resources to efficiently support asymmetric DL/UL traffic (adaptation of DL:UL ratio to DL/UL traffic).
2—It ensures channel reciprocity for better support of link adaptation; MIMO and other closed-loop advanced antenna techniques such as transmit beam-forming.
3—Unlike FDD, which requires a pair of channels, TDD only requires a single channel for both downlink and uplink providing greater flexibility for adaptation to varied global spectrum allocations.
4—Transceiver designs for TDD implementations are less complex and therefore less expensive (restrictions in the number of DL/UL switching points).

However, using TDD requires the cellular system to ensure that at any point, there are no simultaneous UL and DL transmissions as this would lead to interference and wrong decoding (as resources are shared by both DL and UL). For this, a TDD frame structure divides resources into independent DL and UL slots (or subframes/sub-entities). During transition from DL to UL, there is a guard time introduced which insures that all signaling is stopped until it is over. This ensures that after the guard time, there is no pending DL signaling which might interfere with subsequent UL transmissions from any device (i.e., UE/NB).

The guard time is also required to allow the UE sufficient time to process the control/data information it received in past DL slots and prepare itself for the subsequent UL transmission. The UE requires guard time to prepare itself as it has to apply a negative offset to transmit data due to the corresponding timing advance.

The guard time in the cellular systems is roughly proportional to the propagation delay (in order to account for 2*RTT (Round-Trip Time) or maximum timing advance). Switching from the UL to the DL requires no guard time (refer to FIG. 3). This is described in detail in the description section.

Having a guard time proportional to propagation delay for every slot change from the DL to UL can drastically reduce the spectral efficiency of a cellular system in cases where this delay is significantly larger than the slot length. Guard time becomes a problem when propagation delay is very high like in NTN (non-terrestrial network) systems. This is the case for GEO (Geostationary Earth Orbit) satellites (propagation delay=100 ms), MEO (medium Earth orbit) satellites (delay=30 ms) and LEO (Low Earth orbit) satellites (delay <3 ms). This is why newer ways to reduce the guard time and define more flexible frame structure is required.

However this is problematic as soon as propagation delay becomes large as compared to the TTI/Subframe/Frame duration. For example, for a GEO satellite system, the one-way propagation delay is more than 100 ms. To combat this, the frame structure needs to tackle two deficiencies that large delays introduce, namely:
1. A large delay between grant assignment and UL transmission
   a. PDCCH and PUSCH will be significantly spaced apart
2. Interference of DL with UL slots
   a. In an example, at the Satellite based BS, the DL for UE1 can be interfered by UL of UE2

It is to be noted that scenario i) above happens in Unlicensed band of operation as well where the PDCCH (grant allocation) and the related PUSCH (Uplink transmission) can happen significantly if the channel is not available (other neighboring device may have grabbed the channel) so the same solution for MCS Indication as disclosed here can be applied.

For tackling the allocation and use of grants, the cellular system can adopt a semi-persistent/persistent grant access scheme that minimizes to and fro control signaling between the UE and base station. For instance in the LTE, in order to support more allocations, without increasing the size of the PDCCH, semi-persistent scheduling (SPS) is useful. With SPS, the UE is pre-configured by the base station with an SPS-RNTI (allocation ID) and a periodicity. Once pre-configured, if the UE were to receive an allocation (DL/UL) using the SPS-RNTI (instead of the typical C-RNTI), then this one allocation would repeat according to the pre-configured periodicity. This can be useful when we want to minimize signaling grants to UEs due to increased propagation delay leading to large delay. We can use the methods of MCS List as proposed above for both the unlicensed band operation and Aerial Communication.

The embodiments herein can provide a method and system for selecting a Modulation Coding Scheme (MCS) in a wireless communication system. In addition, the embodiments herein can support a TDD frame in high propagation delay cells using a flexible frame structure. Also, the embodiments herein can avoid very large guard times by using a flexible frame structure and optimizing a send and receive procedure.

Accordingly, the embodiments herein disclose a method for selecting a MCS in a wireless communication system. The method may include receiving, by a UE, a list of default MCS from a base station. Further, the method may include measuring, by the UE, a CQI. Further, the method may include selecting, by the UE, at least one MCS from the list of default MCS based on the measured CQI.

Accordingly, the embodiments herein disclose method for supporting a TDD frame in a high propagation delay cell using a frame structure in a wireless communication system. The method may include configuring, by a base station, a frame structure based on a minimum delay associated with a cell, maximum delay associated with the cell, differential delay associated with the cell and a slot length. Further, the method may include controlling, by the base station, a guard time based on the minimum delay associated with the cell, the maximum delay associated with the cell, the differential delay associated with the cell and the slot length. Further, the method may include supporting, by the base station, the TDD frame based on the guard time.

Unlike conventional methods and systems, the proposed method can be used to select the MCS for a NR non-terrestrial network and a NR unlicensed. The method can be used to select the MCS for systems where data transmission can get delayed (e.g. due to LBT Failure in NR Unlicensed) or systems where propagation delay is very large (e.g. NR NTN).

The system may provide a mechanism for MCS selection for systems where data transmission can get delayed (e.g. due to LBT Failure in NR Unlicensed) or systems where propagation delay is very large (e.g. NR NTN) for the scenario when MCS information indicated to a UE in UL/DL grant become outdated or a CQI report from the UE is obsolete due to change channel conditions. The proposed method may include synchronizing a MCS table. The system may perform UE based MCS selection for PUSCH transmission and PDSCH transmission. The system may also perform learning/prediction based MCS selection for PUSCH transmission and PDSCH transmission. The system may provide flexible MCS indication, fallback/advance MCS, DCI based modification/indication based on the proposed method.

The method can be used to support the TDD frame in high propagation delay cells using a flexible frame structure. The system may support TDD cellular access for non-terrestrial networks despite high propagation delay. Further, the system may provide a flexible frame structure for optimizing cell access in various delay scenarios. The method may be used for avoiding very large guard times by using a flexible frame structure and optimizing the send and receive procedure.

In an embodiment, if the associated control channel (PDCCH/PUCCH) for an uplink or downlink data channel (PDSCH/PUSCH) does not indicate the MCS (or the list of MCS) then the most recent received MCS list may be used by the UE. The default MCS wherever used, may be the 1st MCS in the most recent list of MCS transmitted by the base station (received by the UE).

In an embodiment, when the UE uses the 1st MCS from the list then it doesn't need to inform the MCS back. The BS if it doesn't receive the MCS used from the UE, it will assume that UE has used the 1st MCS and hence no extra signaling is needed.

In an embodiment, if the UE determines that none of the MCS given by the BS in the MCS list are suitable, then it may use the MCS that it identifies as best (from the overall table of MCS as per specification) and signals the actual MCS index used in the UCI.

Referring now to the drawings, and more particularly to FIGS. 1 through 19, where similar reference characters denote corresponding features consistently throughout the figures, there are shown preferred embodiments.

Below are the terminologies used in the disclosure:
NR: New Radio. This term is synonymous to 5G
LTE: Long Term Evolution. This term is synonymous to 4G.
DCI: Downlink Control Information
UCI: Uplink Control Information
PDCCH: Physical Downlink Control Channel
PUCCH: Physical Uplink Control Channel
PDSCH: Physical Downlink Shared Channel
PUSCH: Physical Uplink Shared Channel
CQI: Channel Quality Indicator
MAC: Medium Access Control
CE: Control Element
NB: NodeB (refers to eNodeB for LTE, gNodeB for 5G and base station in general)
UE: User Equipment
MCS: Modulation and Coding Scheme
RRC: Radio Resource Control
LBT: Listen Before Talk
SI: System Information
RB: Resource Block
RBG: Group of Resource Block's
GT: Guard time
TA: Timing advance
eNB: enhanced NodeB (LTE NodeB)
gNB: 5G NodeB
UAV: Unmanned Aerial Vehicle
(N)TNB: (Non-)Terrestrial NodeB
TDD: Time division duplexing
FDD: Frequency division duplexing
UL: Uplink
DL: Downlink FIG. 1 is a schematic diagram illustrating an example for a solution based on a proposed method for selecting a MCS in a wireless communication system (300), according to the embodiments as disclosed herein. The wireless communication system (300) can be a Non-Terrestrial communication system.

(1) UE Based MCS Selection for PUSCH Transmission:

Configuration: The base station (200) will configure default MCS (can be static, semi-static or configurable by the base station (200) via DCI/RRC Message/MAC CE for a UCI transmission for MCS indication when it is appended with the PUSCH transmission. The base station (200) can configure the base MCS for each UL HARQ process. The configuration can be same for all or specific for each HARQ process. The configuration can be static, semi-static or configurable by the base station (200) via DCI/RRC Message/MAC CE.

UE Behavior: 1) The MCS used for the PUSCH transmission will be decided by the UE (100) based on the latest CQI measurement. 2) The UE (100) will indicate the MCS used to the base station (200) using the UCI. If the PUSCH itself is used to send the MCS, the UE (100) will be append the UCI to the intended PUSCH transmission using a default MCS for the UCI. 3) If no MCS information is provided in the grant and it is the first transmission for the HARQ process and base MCS is configured for it and the UE (100) intends to use base MCS for the PUSCH transmission; or if no MCS information is provided in the grant and if the UE (100) intends to use the same MCS as the previous transmission for the HARQ process then, the UE (100) need not send the UCI indicating the MCS used with the PUSCH. 4) If the MCS information was indicated in the grant and the UE (100) intends to use the same MCS as provided in the grant then, the UE (100) need not send the UCI indicating the MCS used with the PUSCH.

Base station behavior: 1) the base station (200) can choose not to provide the MCS information in the UL grant. 2) If the UCI indicating MCS information for the PUSCH transmission corresponding to a HARQ process was decoded, then the base station (200) shall use the MCS indicated in the UCI to decode PUSCH. 3) If the base station (200) has indicated the MCS information in the grant and no UCI indicating the MCS information for the PUSCH transmission was decoded, then the base station (200) shall use the MCS indicated in the grant to decode PUSCH. 4) If the base station (200) has not indicated MCS information in the grant and it is first PUSCH transmission corresponding to the HARQ process and no UCI indicating MCS information for PUSCH transmission was decoded, then the base station (200) shall use the base MCS configured for the HARQ process to decode PUSCH. 5) If the base station (200) has not indicated MCS information in the grant and it is not first PUSCH transmission corresponding to the HARQ process and no UCI indicating MCS information for PUSCH transmission was decoded, then the base station (200) shall use the MCS same as what was used for previous PUSCH transmission for the HARQ process to decode the PUSCH.

(2) Flexible MCS Indication in the MCS Selection for the PUSCH Transmission:

In an embodiment, the base station (200) will indicate in the UL grant, a list of MCS which can be used by the UE (100) for PUSCH transmission. The UE (100), based on channel conditions at the time of PUSCH transmission, will select an appropriate MCS from the list of MCS provided by the base station (200), to be used for PUSCH transmission. The base station (200) will perform blind decoding using all the MCS provided in the UL grant, until PUSCH transmission is successfully decoded and declare decoding failure only when the PUSCH cannot be decoded using any the MCS provided in the UL grant.

In another embodiment, the base station (200) will indicate in the UL grant, a list of MCS which can be used by the UE (100) for the PUSCH transmission. The base station (200) will configure default MCS (can be static, semi-static or configurable by the base station (200) via DCI/RRC Message/MAC CE) or/and indicate default MCS in the UL grant, which will be used for UCI transmission for the MCS indication when it is appended with PUSCH transmission. The UE (100), based on the channel conditions at the time of PUSCH transmission, will select an appropriate MCS from the list of MCS provided by the base station (200), to be used for the PUSCH transmission. The UE (100) will indicate the MCS used to the base station (200) using the UCI (sending this UCI may or may not be mandatory). If the PUSCH itself is used to send the MCS, the UE (100) will be append the UCI to the intended PUSCH transmission using the default MCS for the UCI. If base station (200) successfully decodes the UCI containing the information regarding the MCS used, the base station (200) shall use the MCS indicated in UCI to decode PUSCH. If the base station (200) cannot successfully decode the UCI containing the information regarding the MCS used, the base station (200) will perform blind decoding using all the MCS provided in the UL grant, until the PUSCH transmission is successfully decoded and declare decoding failure only when PUSCH cannot be decoded using any the MCS provided in the UL grant.

(3) Fallback/Advance MCS in the MCS Selection for the PUSCH Transmission:

In an embodiment, the base station (200) will configure one or more fallback/advance MCS values for each HARQ process. The configuration can be same for all or specific for each HARQ process and the configuration can be static, semi-static or configurable by base station (200) via DCI/RRC Message/MAC CE. If the UE (100) finds the channel conditions insufficient/superfluous to use the MCS provided in the UL grant, then it shall use an appropriate MCS from the list of fallback/advance MCS values for PUSCH transmission. The base station (200) shall try to decode PUSCH using the MCS provided in the grant and the configured fallback/advance MCS values until PUSCH is successfully decoded. The base station (200) shall declare decoding failure if PUSCH cannot be successfully decoded using the MCS provided in the grant and any of the fallback/advance MCS values.

In another embodiment, the base station (200) will configure one or more fallback/advance MCS values for each HARQ process. The configuration can be same for all or specific for each HARQ process and the configuration can be static, semi-static or configurable by the base station (200) via the DCI/RRC Message/MAC CE. The base station (200) will configure the default MCS (can be static, semi-static or configurable by the base station (200) via the DCI/RRC Message/MAC CE) or/and indicate default MCS in UL grant, which will be used for the UCI transmission for the MCS indication when it is appended with PUSCH transmission. If the UE (100) finds the channel conditions insufficient/superfluous to use the MCS provided in the UL grant, then it shall use an appropriate MCS from the list of fallback/advance MCS values for PUSCH transmission. The UE (100) will indicate the MCS used to base station (200) using the UCI (sending this UCI may or may not be mandatory). If the PUSCH itself is used to send MCS, the UE (100) will be append the UCI to the intended PUSCH transmission using a default MCS for UCI. If the base station (200) successfully decodes the UCI containing the information regarding the MCS used, the base station (200) shall use the MCS indicated in UCI to decode PUSCH. If base station (200) cannot successfully decode the UCI containing the information regarding the MCS used, the base station (200) shall try to decode the PUSCH using the MCS provided in the grant and the configured fallback/advance MCS values until PUSCH is successfully decoded. The base station (200) shall declare decoding failure if PUSCH cannot be successfully decoded using the MCS provided in the grant and any of the fallback/advance MCS values.

(4) Learning/Prediction Based MCS Selection for PUSCH Transmission:

The base station (200) can choose to either not provide MCS information in the UL grant or indicate in the UL grant, a singular MCS or a list of MCS which can be used by the UE for the PUSCH transmission. The UE uses a program for predicting channel conditions trained on data that it may/may-not periodically share with the base station (200). Additionally, the base station (200) can also run an identical instance of the program to avoid feedback.

UE behavior: The MCS for an uplink transmission may be decided by the UE (100) based on the channel conditions predicted by a program running inside the UE (100). This MCS can be indicated to the base station (200) by appending this MCS information in the PUSCH transmission using a default MCS as detailed in section "UE based MCS selection for PUSCH transmission". The UE (100) can also decide to not use the predicted MCS and instead based on this predicted MCS, use an MCS from the list indicated by the base station (200) (using a static/semi-static function) like in section "Flexible MCS Indication". The UE (100) can use this MCS value for PUSCH transmission without indicating it to the base station (200).

Base station behavior: 1) If the UCI indicating MCS information for PUSCH transmission corresponding to the HARQ process was decoded, then the base station (200) shall use the MCS indicated in UCI to decode the PUSCH. 2) If the base station (200) has indicated MCS information in the grant and no UCI indicating MCS information for the PUSCH transmission was decoded, then the base station (200) shall use the MCS indicated in the grant to decode PUSCH or use blind decoding for the list of MCS indicated in UL grant (if applicable). 3) The base station (200) can get to know about the MCS used by the UE (100) for PUSCH transmission using the prediction obtained from another identical instance of the channel prediction program running in base station (200) and try to decode PUSCH transmission. 4) The base station (200) may declare decoding failure if it fails to decode PUSCH using one/more of the above steps.

Figure 2:
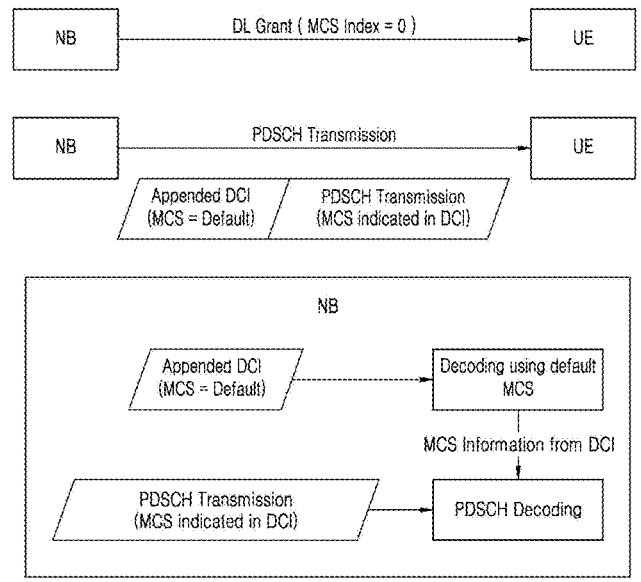
FIG. 2 is a schematic diagram illustrating an example for another solution based on the proposed method for selecting a MCS in a wireless communication system, according to the embodiments as disclosed herein.

FIG. 2 is a schematic diagram illustrating an example for another solution based on the proposed method for selecting a MCS in the wireless communication system (300), according to the embodiments as disclosed herein.

(1) DCI Based Modification/Indication in MCS Selection for PDSCH Transmission:

Configuration: The base station (200) will configure default MCS (can be static, semi-static or configurable by base station (200) via DCI/RRC Message/MAC CE) for the DCI transmission for the MCS modification when it is appended with the PDSCH transmission. The base station (200) can configure base MCS for each DL HARQ process. The configuration can be same for all or specific for each HARQ process. The configuration can be static, semi-static or configurable by the base station (200) via the DCI/RRC Message/MAC CE.

NB Behavior: 1) The MCS used for the PDSCH transmission can be different from what was indicated in the DL grant or the base station (200) can choose to avoid providing MCS information in the DL grant. 2) The base station (200) will indicate the MCS used to the UE using the DCI. If the PDSCH itself is used to indicate the MCS or the MCS modification, the base station (200) will be append the DCI to the intended PDSCH transmission using a default MCS for the DCI. 3) If no MCS information was provided in the grant and it is the first transmission for the HARQ process and the base MCS is configured for it and the base station (200) intends to use base MCS for the PDSCH transmission; or if no MCS information was provided in the grant and if base station (200) intends to use the same MCS as the previous transmission for the HARQ process then, the base station (200) need not send the DCI indicating the MCS used with PDSCH. 4) If MCS information was indicated in the grant and base station (200) intends to use the same MCS as provided in the grant-base station (200) need not send the DCI indicating the MCS used with PDSCH.

UE behavior: 1) If the DCI indicating MCS information for PDSCH transmission corresponding to the HARQ process was decoded, then the UE (100) shall use the MCS indicated in the DCI to decode PDSCH. 2) If the base station (200) has indicated MCS information in the grant and no DCI indicating MCS information for PDSCH transmission was decoded, then the UE (100) shall use the MCS indicated in the grant to decode PDSCH. 3) If the base station (200) has not indicated MCS information in the grant and it is first PDSCH transmission corresponding to the HARQ process and no DCI indicating MCS information for the PDSCH transmission was decoded, then the UE shall use the base MCS configured for the HARQ process to decode PDSCH. 4) If the base station (200) has not indicated MCS information in the grant and it is not first PDSCH transmission corresponding to the HARQ process and no DCI indicating MCS information for PDSCH transmission was decoded, then the UE shall use the MCS same as what was used for previous PDSCH transmission for the HARQ process to decode PDSCH.

(2) Flexible MCS Indication in MCS Selection for the PDSCH Transmission:

In an embodiment, the base station (200) will indicate in DL grant, a list of MCS which can be used by base station (200) for the PDSCH transmission. The base station (200), based on channel conditions at the time of PDSCH transmission, will select an appropriate MCS from the list of MCS provided, to be used for PDSCH transmission. The UE (100) will perform blind decoding using all the MCS provided in the DL grant, until the PDSCH transmission is successfully decoded and declare decoding failure only when PDSCH cannot be decoded using any the MCS provided in the DL grant.

In another embodiment, the base station (200) will indicate in the DL grant, a list of MCS which can be used by the base station (200) for PDSCH transmission. The base station (200) will configure default MCS (can be static, semi-static or configurable by base station (200) via the DCI/RRC Message/MAC CE) or (and) indicate default MCS in the DL grant, which will be used for the DCI transmission for the MCS indication when it is appended with PDSCH transmission. The base station (200), based on channel conditions at the time of PDSCH transmission, will select an appropriate MCS from the list of MCS provided, to be used for PDSCH transmission. The base station (200) will indicate the MCS used to the UE (100) using the DCI (sending this DCI may or may not be mandatory). If the PDSCH itself is used to send the MCS then, the base station (200) will be append the DCI to the intended PDSCH transmission using a default MCS for the DCI. If the UE (100) successfully decodes the DCI containing the information regarding the MCS used, the UE (100) shall use the MCS indicated in the DCI to decode the PDSCH. If the UE (100) cannot successfully decode the DCI containing the information regarding the MCS used then, the UE (100) will perform blind decoding using all the MCS provided in the DL grant, until PDSCH transmission is successfully decoded and declare decoding failure only when PDSCH cannot be decoded using any the MCS provided in the DL grant.

(3) Fallback/Advance MCS in MCS Selection for the PDSCH Transmission:

In an embodiment, the base station (200) will configure one or more fallback/advance MCS values for each HARQ process. The configuration can be same for all or specific for each HARQ process and the configuration can be static, semi-static or configurable by the base station (200) via the DCI/RRC Message/MAC CE. If the base station (200) finds the channel conditions insufficient/superfluous to use the MCS provided in the DL grant, then it shall use an appropriate MCS from the list of fallback/advance MCS values for PDSCH transmission. The UE (100) shall try to decode PDSCH using the MCS provided in the grant and the configured fallback/advance MCS values until PDSCH is successfully decoded. The UE (100) shall declare decoding failure if PDSCH cannot be successfully decoded using the MCS provided in the grant and any of the fallback/advance MCS values.

In another embodiment, the base station (200) will configure one or more fallback/advance MCS values for each HARQ process. The configuration can be same for all or specific for each HARQ process and the configuration can be static, semi-static or configurable by the base station (200) via DCI/RRC Message/MAC CE. The base station (200) will configure default MCS (can be static, semi-static or configurable by the base station (200) via the DCI/RRC Message/MAC CE) or (and) indicate default MCS in DL grant, which will be used for DCI transmission for MCS indication when it is appended with PDSCH transmission. If the base station (200) finds the channel conditions insufficient/superfluous to use the MCS provided in the DL grant, then it shall use an appropriate MCS from the list of fallback/advance MCS values for PDSCH transmission. The base station (200) will indicate the MCS used using DCI (sending this DCI may or may not be mandatory). If the PDSCH itself is used to send MCS, the base station (200) will be append the DCI to the intended PDSCH transmission using a default MCS for DCI. If the UE (100) successfully decodes the DCI containing the information regarding the MCS used then, the UE (100) shall use the MCS indicated in the DCI to decode the PDSCH. If the UE (100) cannot successfully decode the DCI containing the information regarding the MCS used then, the UE (100) shall try to decode PDSCH using the MCS provided in the grant and the configured fallback/advance MCS values until PDSCH is successfully decoded. The UE (100) shall declare decoding failure if the PDSCH cannot be successfully decoded using the MCS provided in the grant and any of the fallback/advance MCS values.

(4) Learning/Prediction Based MCS Selection for PDSCH Transmission:

The base station (200) can choose to either not provide MCS information in the DL grant or indicate in DL grant, a singular MCS or a list of MCS which can be used by the UE (100) for decoding PDSCH transmission. The base station (200) may use a program for predicting channel conditions trained on data that it may/may-not periodically share with the UE (100). Additionally the UE (100) can also run an identical instance of the program to avoid feedback between itself and the base station (200).

The base station behavior: The MCS for the downlink transmission may be decided by the base station (200) based on the channel conditions predicted by a program running inside the base station (200). This MCS can be indicated to the UE (100) by appending this MCS information in the PDSCH transmission using the default MCS as detailed in section "DCI based modification/indication in MCS selection for PDSCH transmission" for PDSCH. The base station (200) can also decide to not use the predicted MCS and instead based on this predicted MCS, use an MCS from the list indicated in DL grant to the UE (100) (using a static/semi-static function) like in section "Flexible MCS indication in MCS selection for PDSCH transmission" for PDSCH. The base station (200) can use this MCS value for PDSCH transmission without indicating MCS information to the UE (100).

UE behavior: If MCS information for the PDSCH transmission corresponding to the HARQ process was decoded, then the UE (100) shall use the MCS indicated to decode PDSCH. If the base station (200) had indicated MCS (singular/list) information in the DL grant and no MCS information for PDSCH transmission was decoded, then the UE shall use the MCS indicated in the DL grant to decode PDSCH or use blind decoding for the list of MCS indicated in the DL grant (if applicable). The UE (100) can get to know about the MCS used by the base station (200) for the PDSCH transmission using the prediction obtained from another identical instance of the channel prediction program running in the UE (100) and tries to decode PDSCH transmission. The UE (100) may declare decoding failure if it fails to decode PDSCH using one/more of the above steps.

MCS Table Synchronization: If the UE (100) or the base station (200) wants to use an MCS index from the MCS table which is currently not active, then it will set the MCS_TABLE_TOGGLE bit in the UCI/DCI used for MCS indication in above mentioned procedures. If MCS_TABLE_TOGGLE BIT is set it will indicate to the UE (100)/the base station (200) that MCS table index indicated in the UCI/DCI corresponds to currently inactive MCS Table. This will however not change the currently active MCS table. Currently active MCS table can be switched only by using the existing NR procedure.

Figure 3:
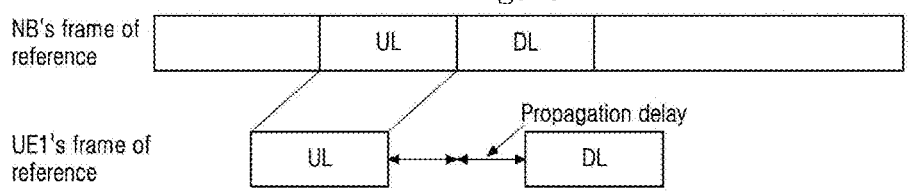
FIG. 3 illustrates a switching between UL and Dl slot, according to the embodiments as disclosed herein.

FIG. 3 illustrates a switching between the UL slot and the DL slot, according to the embodiments as disclosed herein.

The switch from the UL to the DL slot may not require a guard time (due to the danger of interference from consecutive slots) as demonstrated by the following: (refer FIG. 3). Let there be 2 UEs, UE1 and UE2. In order to corrupt UE1's DL slot there must be some UE2 whose UL transmission overlaps with UE1's DL slot. Let there be 3 non-collinear geographical points in the cell. The base station (200), the UE1 and the UE2 form a triangle in space. Now for UE2's UL transmission to overlap with UE1's DL slot, the transmission should travel a distance of UE1-UE2. The time difference between UE2's UL transmission end and UE1's DL reception beginning is equal to the sum of UE2's TA and UE1's TA. Hence to interfere with UE1's DL slot, it should reach UE1 after a time equal to (UE1's TA+UE2's TA), i.e. it should travel a distance more than (UE1-eNB+UE2-eNB). Thus it needs to satisfy the below inequality: UE1-UE2>(UE1-eNB+UE2-eNB).

This may be never true for a set of 3 points in space (This is the reverse of the triangle inequality). This may become an equality in case of collinear points (again leading to no interference due to no overlap). Hence no guard time may be needed for the UL to the DL switching as a DL slot is not corrupted by the previous UL slot as consecutive slots which are UL and DL respectively do not overlap for the UEs (100).

Figure 4:
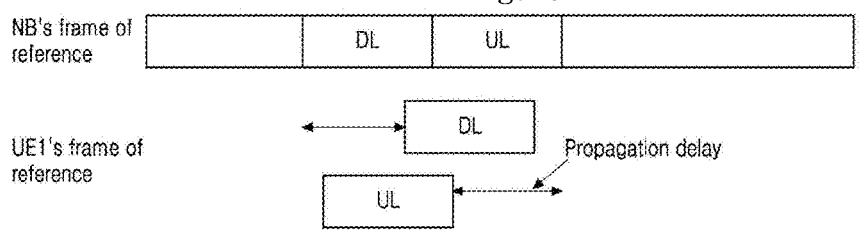
FIG. 4 illustrates an interference during DL to UL switch, according to the embodiments as disclosed herein.

FIG. 4 illustrates an interference during DL to UL switch, according to the embodiments as disclosed herein. During the switch from DL to UL however, the time at which the DL slot reaches the UE (100) and the time from which the UE (100) should start subsequent transmission for the upcoming UL slot can interfere (refer FIG. 4). This interference may also cover the whole slot length. Similarly, it is not necessary that only consecutive slots interfere with each other. Given the timing advance value (due to propagation delay for each individual UE (100)), it is possible that a UL slot can interfere with another DL slot wherein the DL slot trails the UL slot by a significant amount of time (significant amount of time implying here that DL and UL slots might not necessarily be consecutive). The reverse is also true, it is possible that the DL slot can interfere with the UL slot wherein the UL slot is ahead of the DL slot by a significant amount of time.

In typical cellular scenarios, a subframe/slot lasts for a time of the order of a millisecond (refer FIG. 4). Depending on the cell size, the TA can also vary along the magnitude of a microseconds to 10s of microseconds. As the cells gets bigger, the maximum TA also gets bigger.

Figure 5:
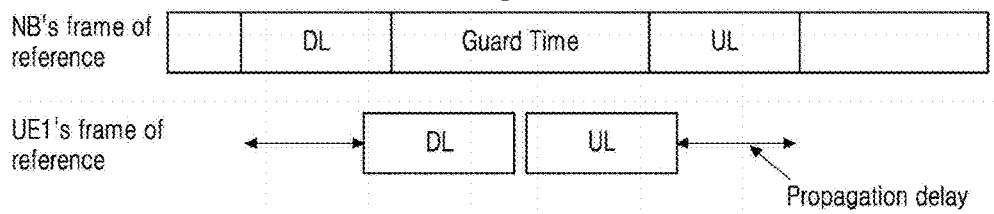
FIG. 5 illustrates a guard time for reducing interference, according to the embodiments as disclosed herein.

FIG. 5 illustrates a guard time for reducing interference, according to the embodiments as disclosed herein. Now for above mentioned scenarios, since the TA value is quite less or comparable to the slot timelines, a guard band is introduced such that it restricts all UL/DL signaling in the guard time which covers the potentially overlapping region (refer FIG. 5)

However this is problematic as soon as propagation delay starts increasing dramatically. For example, for a GEO satellite system, the one-way propagation delay is more than 100 ms. To combat this, the frame structure needs to tackle two deficiencies that large delays introduce, namely: A large delay between grant assignment and UL transmission, and Interference with slots/sub-frames that can be significantly ahead/lagging in time.

For tackling the allocation and use of grants, the cellular system can adopt a semi-persistent/persistent grant access scheme that minimizes to and fro control signaling between the UE (100) and the base station (200). For instance in the LTE, in order to support more allocations, without increasing the size of the PDCCH, semi-persistent scheduling (SPS) is useful. With SPS, the UE (100) may be pre-configured by the base station (200) with an SPS-RNTI (allocation ID) and a periodicity. Once pre-configured, if the UE (100) were to receive an allocation (DL/UL) using the SPS-RNTI (instead of the typical C-RNTI), then this one allocation would repeat according to the pre-configured periodicity. This can be useful when we want to minimize signaling grants to the UEs (100) due to increased propagation delay leading to large delay.

Figure 6:
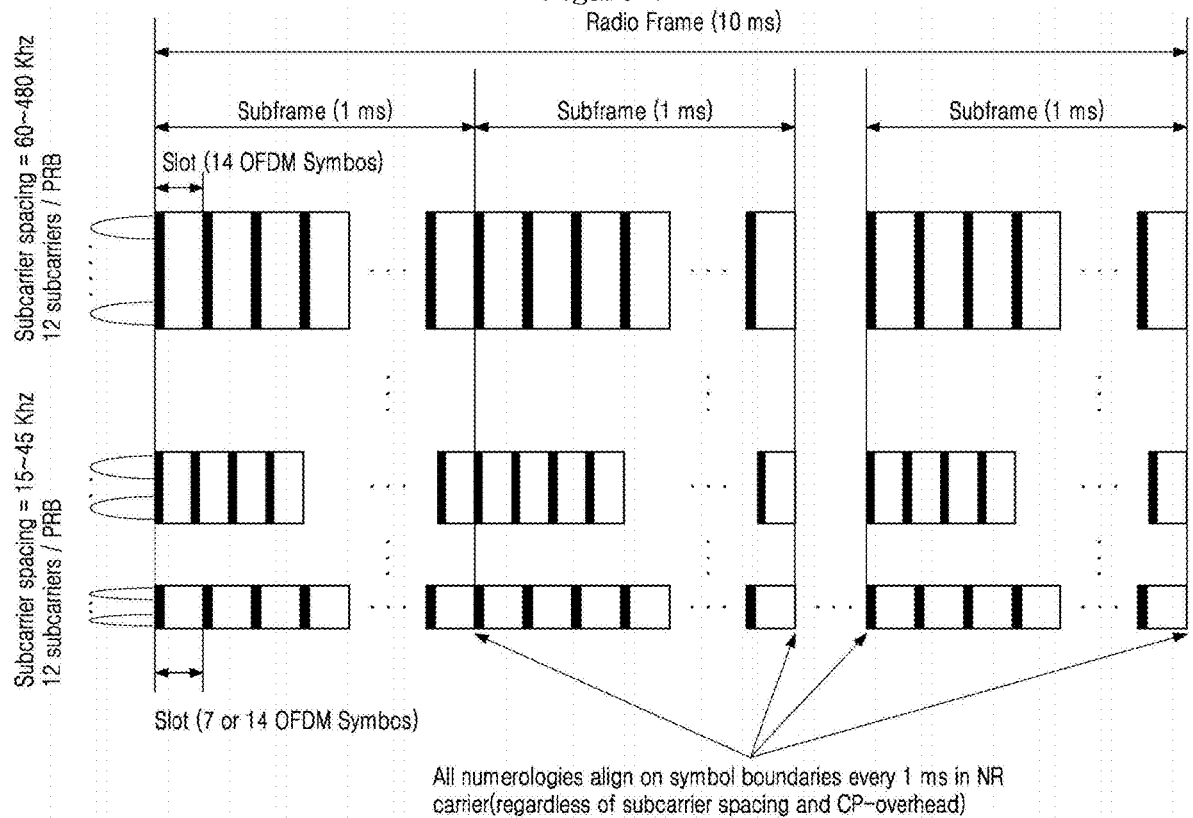
FIG. 6 illustrates typical radio timelines, according to the embodiments as disclosed herein.

FIG. 6 illustrates typical radio timelines, according to the embodiments as disclosed herein.

Figure 7:
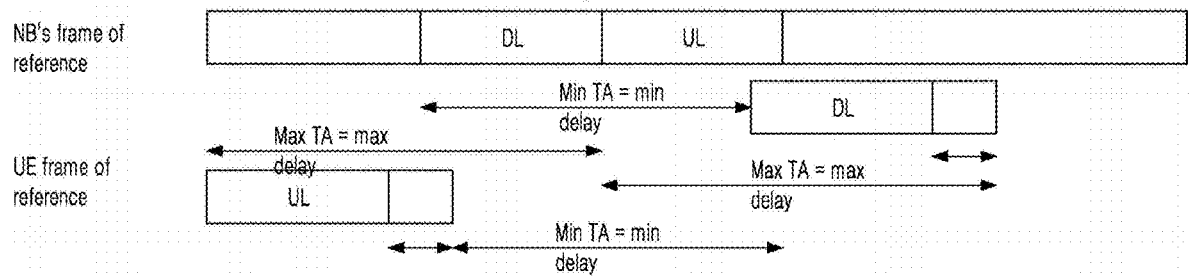
FIG. 7 illustrates a usage of differential delay to model transmission pattern, according to the embodiments as disclosed herein.

FIG. 7 illustrates a usage of differential delay to model transmission pattern, according to the embodiments as disclosed herein.

For tackling the interference problem, the proposed method can be used to model the transmission and reception behavior for the UE (100) and base station (200) based on propagation delay and differential delay (refer FIG. 7). The differential delay may be the difference between the maximum and minimum delay that are possible for satellite cell.

As shown in the FIG. 7, the sum total for all the UL signaling and all the DL signaling can be represented by a rectangle of length equal to the sum of slot length and differential delay. This is because the farthest UE starts UL transmission before the nearest UE by a time period equal to differential delay. The reverse is true for DL where the farthest UE receives a DL signal after a time period of differential delay after the nearest UE receives the same signal. Now, we can no longer work on the assumption that only consecutive slots pose an interference danger because in a general scenario, the propagation delay can be smaller or larger than the slot length. So, the proposed method can be used to minimize DL interference in the UL signal transmission window and UL interference in the DL transmission window.

Figure 8:
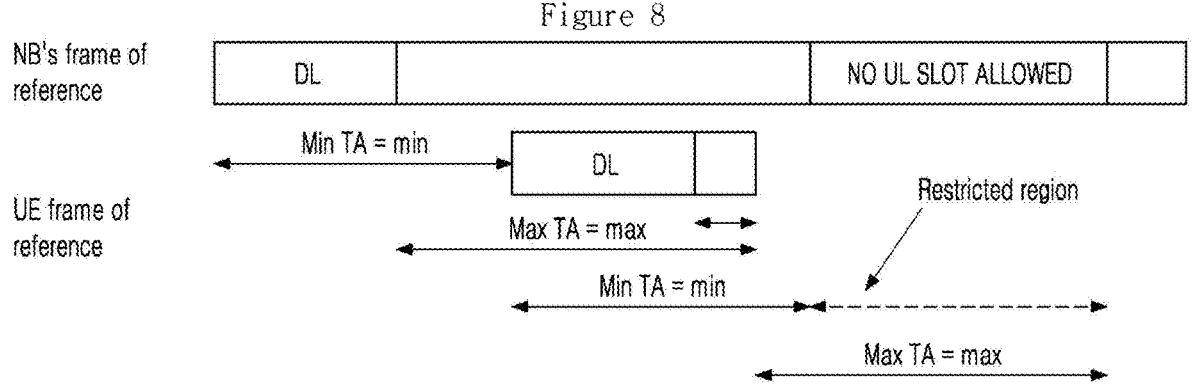
FIG. 8 illustrates a frame structure for avoiding large guard time, according to the embodiments as disclosed herein.

FIG. 8 illustrates a frame structure for avoiding large guard time, according to the embodiments as disclosed herein. In the proposed method, the system define regions that are restricted for UL/DL based on their proximity to neighboring UL/DL slots. The mathematical relation will depend on the minimum, maximum, differential delay of the cell and the slot lengths etc. Based on this modelling, it may suffice for the condition of no interference to hold if the frame structure is constructed in such a way that the position for DL and UL slots is not independent and follows the mathematical relation described below. (also refer FIG. 8)

The mathematical relation is as follows:
1. For a DL slot lasting from time <X> to <X+S_DL>, the restricted area lasts from time=<X+2*min> to <X+2*max+S_DL>. This area should not have a UL slot.
2. For a DL slot lasting from time <X> to <X+S_UL>, the restricted area lasts from time=<X−2*max> to <X−2*min+S_UL>. This area should not have a DL slot. Here X is any point in time, S_DL is the DL slot duration, S_UL is the UL slot duration, min is the minimum propagation delay, max is the maximum propagation delay and the difference of max and min is differential delay. Two sample frames (DL-heavy and UL-heavy) as a product of this algorithm are shown in FIG. 11 for the delay profile with min=4.5 ms, max=5 ms, slot-length for DL/UL/GUARD=1 ms and frame periodicity=10 ms.

Figure 9:
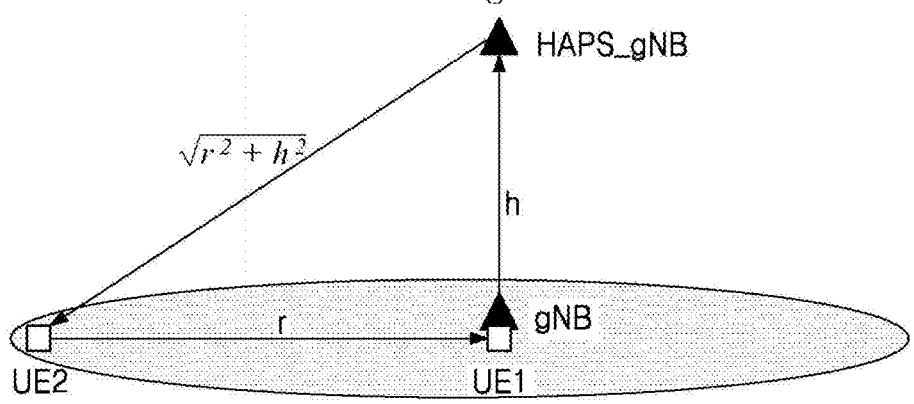
FIG. 9 illustrates a differential delay for a cell, according to the embodiments as disclosed herein.

FIG. 9 illustrates a differential delay for a cell, according to the embodiments as disclosed herein.

1. In one embodiment, the base station (200) may estimate its height/altitude by using mechanisms including but not limiting to GPS, altimeter, barometer etc. and based on this, does:
   a. base station (200) estimates the minimum propagation delay using, at least in part, UE altitude information from any possible UE to the base station (200) and hence the minimum propagation delay (refer FIG. 9), or the UE altitude information, from any possible UE (100) to base station (200) corresponding to different beams, and hence the minimum propagation delay corresponding to different beams.
   b. The base station (200) may also estimate the corresponding differential delay and/or maximum delay using either parameters known to base station (200) depending on cell/beam size and/or GPS positions of UE for one/more cells that are a part of the base station (200).
   c. Using the information obtained in a) and b), base station (200) may use a frame structure which is derived via the algorithm mentioned in clause 2.

FIG. 10 illustrates a method for generating frames, according to the embodiments as disclosed herein.

FIG. 11 illustrates a sample DL-heavy and UL-heavy frames, according to the embodiments as disclosed herein. The sample DL-heavy and UL-heavy frames for min=4.5 ms, Max=5 ms, slot length=1 ms, periodicity=10 ms is shown in the FIG. 9

Figure 12:
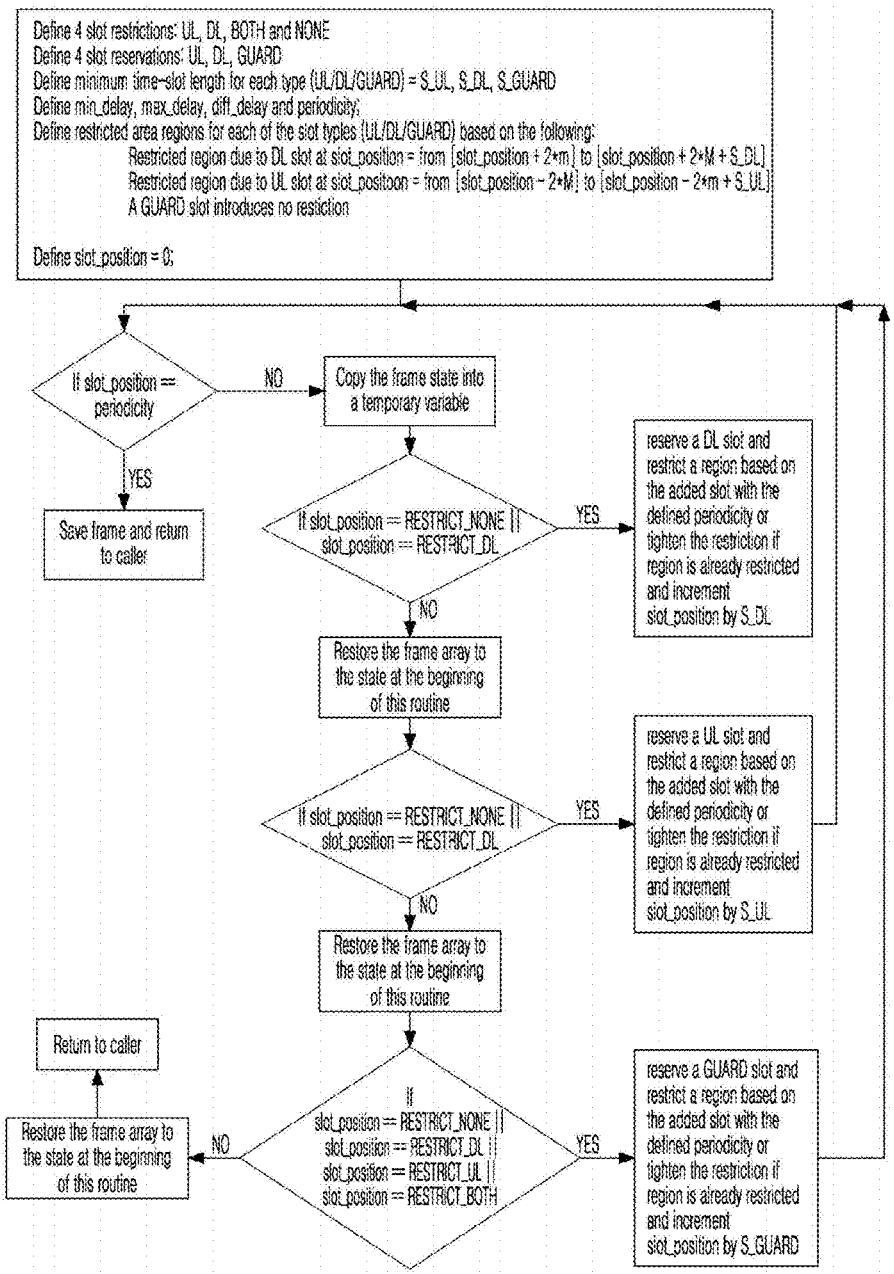
FIG. 12 is a flow diagram based on the proposed method for supporting a TDD frame in a high propagation delay cell using a frame structure in a wireless communication system, according to the embodiments as disclosed herein.

FIG. 12 is a flow diagram based on the proposed method, according to the embodiments as disclosed herein.

2. Given that the minimum, maximum and differential delay is known to a base station (200) (described in detail in clause 1), the range of frame structures to be used is calculated by the base station (200) based on the algorithm (outlined by the pseudo-code) in FIG. 8 and also described by the following flowchart in FIG. 10.

3. As an embodiment of the invention, a restriction condition based on the parameters estimated in clause 1 may be defined as the following. This restriction condition may define an area in time which cannot have a particular slot because of any incompatible slot ahead/behind in time. Mathematically the relation may be defined as follows (min=minimum delay, max=maximum delay, S_DL=DL slot length, S_UL=UL slot length):
   a. For a DL slot lasting from time <X> to <X+S_DL>, the restricted area lasts from time=<X+2*min> to <X+2*max+S_DL>. This area should not have a UL slot.
   b. For a DL slot lasting from time <X> to <X+S_UL>, the restricted area lasts from time=<(X−2*max)> to <(X−2*min)+S_UL>. This area should not have a DL slot.

4. In another embodiment, the frame structure may be derived by the following implementation:
   a. Calculating minimum propagation delay, maximum propagation delay, differential delay, UL slot length, and DL slot length, periodicity of frame and guard slot length.
   b. Based on the parameters estimated in a), defining the restriction conditions as defined in clause 3 and length of corresponding restricted areas corresponding to UL and DL slots.

c. Generating all possible frames based on the parameters defined in a).

d. Filtering out all the frames that do not follow the restricted area relationships.

5. In another embodiment, the frame structure may be derived by the following implementation (described in the flowchart in FIG. 12):

a. Calculating minimum propagation delay, maximum propagation delay, differential delay, UL slot length, DL slot length, periodicity of frame and guard slot length.

b. Based on the parameters estimated in a), defining the restriction conditions as defined in clause 3 and length of corresponding restricted areas corresponding to UL and DL slots.

c. Recursively and incrementally adding slots (UL/DL/GUARD) and discarding them if the frame assembled so far violates restriction conditions.

6. In another embodiment, the base station (200) may decide the periodicity of frames based on a static/semi-static function of minimum, maximum and differential delay of the cell. In an example, there may be a possibility that repeating a frame after every 15 ms instead of a previously mandated duration (say, 10 ms) is more beneficial for a particular delay profile (based on the number of frames possible). The base station (200) signals information about this periodicity to the UE (100) in MIB/SIB/any new message or as an RRC configuration.

7. In another embodiment, for every change in UL-DL configuration (the weightage of UL versus DL slots in a periodic cycle), the base station (200) may apply the guard time that is a static/semi-static function of minimum delay and/or maximum delay and/or differential delay and/or the nature of previous UL-DL configuration and/or upcoming UL-DL configuration. This would be useful during changes in frame configuration. As different frame types/configurations will have different positions of UL/DL/GUARD slots in time, there would be different restricted areas for them (as defined in clause 3). These different restricted areas corresponding to these two different frame types/configurations may not be mutually compatible. The base station (200) signals information about this guard time to the UE (100) in MIB/SIB/any new message or as an RRC configuration.

8. In another embodiment, the base station (200) can also apply a guard time that is a static/semi-static function of minimum delay and/or maximum delay and/or differential delay of the cell/beam area or a function of the number of UEs (100), between two periodic cycles corresponding to the same UL-DL frame configuration. This can be useful when base station (200) requires a time delay between 2 frames of the same configuration. This could be to reduce signaling or waiting for some time after communicating a configuration change etc. The base station (200) signals information about this guard time to UE in MIB/SIB/any new message or as an RRC configuration.

9. In another embodiment, the base station (200) may allocate zero or more frequency resource pools with conventional TDD/FDD frames and zero or more with the flexible frame structure proposed in this document whose number and structure (including the slot length, periodicity, guard time and specific UL-DL configurations) can vary according to the following parameters (a-f). The base station (200) may broadcast information about these pools in MIB/SIB/any new message or as an RRC configuration. The optimized frame structure pool allocation can depend on: a. Throughput requirement of a cell/beam, b. Average nature of scenario like UL-heavy or DL-heavy, c. Number of potential UEs, d. Maximum/Minimum/Differential propagation delay of the cell/beam area, e. Latency requirements of certain specific UEs or services/applications, and f. Specific delay profiles for a set of UEs within a specific range of heights.

10. In another embodiment, the UE may decode the information about the available resource pools and decide on which pool and frame to use based on its application/service, and/or latency and/or throughput requirement, and/or based on whether it will be UL-heavy or DL-heavy and/or the delay characteristic of the cell.

11. In another embodiment, the UE can fall back from the flexible TDD frame scheme to the conventional frame structure or any other access scheme available based on: a. A command from base station (200) (signaled to UE in MIB/SIB/any new message or as an RRC configuration), b. Service/latency/throughput requirements of the UE, c. Delay profile change undergone by the base station (200) or the UE.

In case if UE initiates the fallback to conventional TDD frames, it can do so via any new type of message or an RRC request).

12. In another embodiment, the base station (200) may calculate the periodicity of persistent/semi-persistent grants configured for the UE (100) upon connection establishment based on a static/semi-static function of minimum/maximum/differential delay of the cell/beam.

13. In another embodiment, the base station (200) may alter the grant slots for the UE/multiple UEs (100) while accompanying the command with a guard time that can range from zero to a static/semi-static function of the minimum/maximum/differential delay of the cell/beam area or a function of the current and next UL-DL configuration.

Figure 13:
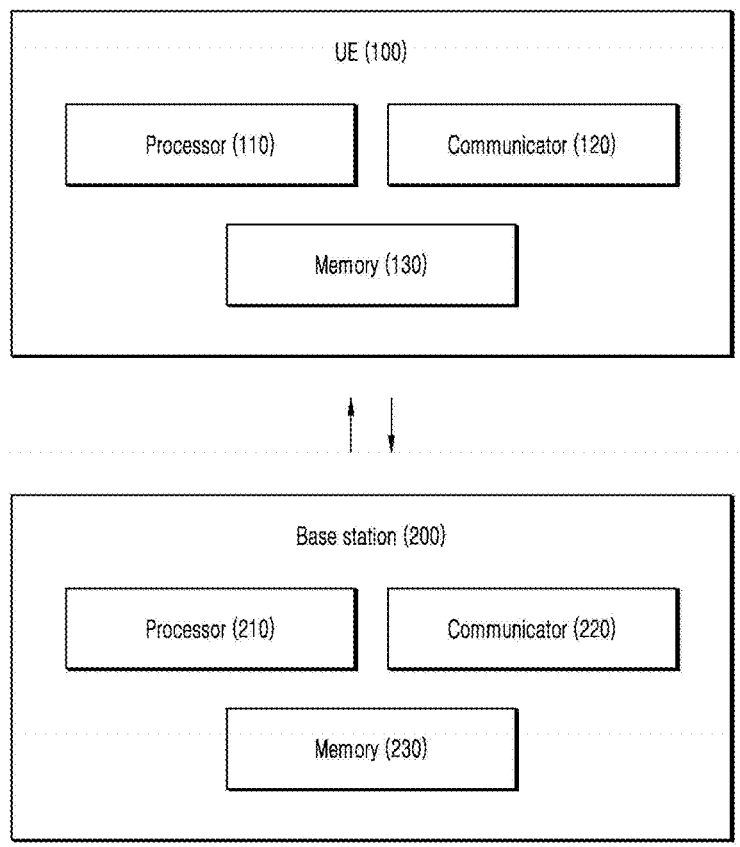
FIG. 13 illustrates a schematic overview of the wireless communication system for selecting a MCS, according to the embodiments as disclosed herein.

FIG. 13 illustrates a schematic overview of the wireless communication system (300) for selecting a MCS, according to the embodiments as disclosed herein. In an embodiment, the wireless communication system (300) may include the UE (100) and the base station (200). The UE (100) can be, for example but not limited to a Unmanned Aerial Vehicle (UAV), an airplane, a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) may include a processor (110), a communicator (120), and a memory (130). However, all of the illustrated components are not essential. The UE (100) may be implemented by more or less components than those illustrated in FIG. 13. In addition, the processor (110) and the communicator (120) and the memory (130) may be implemented as a single chip according to another embodiment. The processor (110) is coupled with the memory (130) and the communicator (120). The processor (110) may include one or more processors or other processing devices that control the proposed function, process, and/or method. Operation of the UE (100) may be implemented by the processor (110). In an embodiment, the processor (110) may receive a list of default MCS from the base station (200) and measure a CQI. In an embodiment, the UE (100) may receive the list of default MCS from the base station (200) via at least one a downlink control information (DCI) message, a Radio Resource Control (RRC) Message, and a Medium Access Control Control-Element (MAC CE) message for a UCI transmission. The processor (110) may select at least one MCS from the list of default MCS based on the measured CQI. In an embodiment, the MCS may be selected by determining that a measured CQI is not matching with a predefined CQI using the mapping table, and selecting the MCS based on the determination. In an example, the processor (110) may measure the CQI and checks from the list of MCS which MCS is best suitable (closest) for the measured CQI based on a mapping table (The mapping table is: CQI range 1: MCS 1 To CQI range n: MCS n). If the CQI is detected as 'm' and if the list of MCS does not contain MCS 'm' then the processor (110) may select the 'more robust' MCS which is closest to m. In the example, assuming MCS1 is most robust, the processor will select the lowered number MCS that is present in the list of MCS that is closest to m.

The processor (110) may calculate the CQI using existing methods. Further, the processor (110) may then map to the MCS Index (as per specifications) using a table. Further, the processor (110) may then check if the identified MCS Index is same as the one suggested by the base station (200) or not.

In an embodiment, the CQI may be measured using at least one of a channel history, a channel usage experience and a machine learning procedure e.g., LSTM, deep neural network or the like In an embodiment, the UCI may include an index associated with the MCS in the packet. In another embodiment, the UCI may include at least one a control bit followed by an index associated with the MCS in a packet. In an embodiment, a control bit may be needed to inform the base station that a PDSCH is appended with the UCI when the UCI is appended to the PDSCH.

Further, the processor (110) may indicate the at least one MCS along with a packet in a control channel to the base station (200). In an embodiment, the processor (110) may indicate the index in the ordered list instead of an actual MS index In an embodiment, the at least one MCS along with the packet may be indicated in the control channel to the base station (200) using the UCI.

In an embodiment, the UE (100) may be append the UCI to an intended PUSCH transmission using at least one default MCS from the list of default MCS for the UCI, if the PUSCH transmission is used to send the MCS to the base station (200).

In another embodiment, the processor (110) may receive at least one MCS from a list of MCS indicated in the DCI message and decode a PDSCH using the at least one MCS indicated in the DCI. In an embodiment, the UE (100) may utilize the MCS indicated in a grant to decode the PDSCH, if the base station (200) has indicated the MCS information in the grant and the DCI not indicating the MCS information for the PDSCH transmission is decoded. In another embodiment, the UE (100) may utilize a default MCS configured for a HARQ process to decode the PDSCH, if the base station (200) has not indicated MCS information in a grant and the MCS is first PDSCH transmission corresponding to a HARQ process and no DCI indicating MCS information for the PDSCH transmission is decoded.

The processor (110) may execute instructions stored in the memory (130) and to perform various processes. The communicator (120) may be configured for communicating internally between internal hardware components and with external devices via one or more networks.

The memory (130) may store instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

In an embodiment, the base station (200) may include a processor (210), a communicator (220), and a memory (230). The processor (210) is coupled with the memory (230) and the communicator (220). However, all of the illustrated components are not essential. The base station (200) may be implemented by more or less components than those illustrated in FIG. 13. In addition, the processor (210) and the communicator (220) and the memory (230) may be implemented as a single chip according to another embodiment. The processor (210) may include one or more processors or other processing devices that control the proposed function, process, and/or method. Operation of the base station (200) may be implemented by the processor (210). In an embodiment, the processor (210) may send a list of default MCS to the UE (100) and receive at least one MCS, from the list of default MCS, along with the packet in the control channel from the UE (100) using an Uplink Control Information (UCI). In an embodiment, the base station (200) may send the list of default MCS to the UE (100) through at least one a DCI message, a RRC Message, and a MAC CE message for a UCI transmission when the at least one MCS from the list of default MCS is appended with a PUSCH transmission.

In an embodiment, the proposed method is implemented for Downlink only if the DCI and PDSCH (data) are not sent to the UE in the same timelines. If the DCI and PDSCH are sent in same timeline (e.g., same frame) then it becomes same as existing system. Basically, the base station may have encoded the PDSCH packet with same MCS as the MCS it is indicating in DCI so no need of any extra method. Such a scenario can arise in case of persistent allocation methods where RBs are assigned to the UE for multiple frames but DCI is optimized to given only at the start.

In an embodiment, the processor (210) may decode the UCI containing the at least one MCS and decode a PUSCH using the at least one decoded MCS.

In an embodiment, the processor (210) may determine that the PUSCH is not able to decode using the at least one decoded MCS and perform a fallback to the default MCS.

In an embodiment, the UE (100) may not indicate the MCS back to the base station (200). The base station (200) may do iterative decoding (one at a time) based on the ordered list of the MCS that it had indicated to the UE (100) to find out which MCS, the UE (100) has used.

In an embodiment, the processor (210) may configure the frame structure based on the minimum delay associated with the cell, the maximum delay associated with the cell, differential delay associated with the cell and the slot length. Further, the processor (210) may control a guard time based on the minimum delay associated with the cell, the maximum delay associated with the cell, the differential delay associated with the cell and the slot length. In an embodiment, the processor (210) may be configured to support the TDD frame based on the guard time. In an embodiment, the guard time may be controlled by defining at least one region using a mathematical relation, wherein the at least one region is restricted for at least one of an uplink (UL) and a downlink (DL) based on at least one neighboring UL slot and a DL slot. The slots that are to be used as guard time may be computed by defining the restriction regions as for downlink: X+2*(minimum propagation delay) to X+2*(maximum propagation delay)+slot length, that does not have an uplink slot, and for uplink: X−2*(maximum propagation delay) to X−2*(minimum propagation delay)+slot length, that does not have a downlink slot, where X is the start of a slot.

In an embodiment, the processor (210) may send information about the guard time to the UE (100) via at least one a MIB message, a SIB message and a RRC configuration. In an embodiment, the processor (210) may broadcast information about the frame structure via at least one of a MIB message, a SIB message and a RRC configuration to the UE (100). In an embodiment, the frame structure may be configured based on at least one a throughput requirement of the cell, a throughput requirement of a beam, an average nature of UL-heavy or DL-heavy, a number of potential UEs, a maximum/Minimum/Differential propagation delay of the cell/beam area, latency requirements of the UE (100) or services/applications, and delay profiles for the UE (100) within a specific range of heights.

The processor (210) may execute instructions stored in the memory (230) and to perform various processes. The communicator (220) may be configured for communicating internally between internal hardware components and with external devices via one or more networks.

The memory (230) may store instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Although the FIG. 13 shows various hardware components of the wireless communication system (300) but it is to be understood that other embodiments are not limited thereon. In other embodiments, the wireless communication system (300) may include less or more number of components. Further, the labels or names of the components are used only for illustrative purpose and does not limit the scope of the invention. One or more components can be combined together to perform same or substantially similar function to select the MCS.

Figure 14:
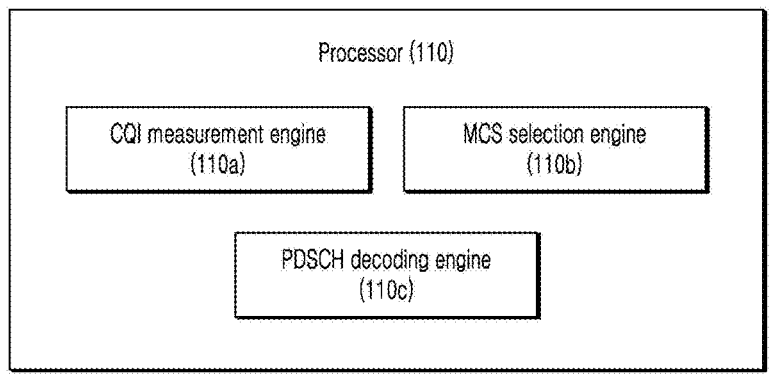
FIG. 14 illustrates various elements in a processor included in a UE, according to the embodiments as disclosed herein.

FIG. 14 illustrates various elements in the processor (110) included in the UE (100), according to the embodiments as disclosed herein. In an embodiment, the processor (110) may include a CQI measurement engine (110a), a MCS selection engine (110b) and a PDSCH decoding engine (110c). In an embodiment, the CQI measurement engine (110a) may receive the list of default MCS from the base station (200) and measure the CQI. Further, the MCS selection engine (110b) may select at least one MCS from the list of default MCS based on the measured CQI. Further, the MCS selection engine (110b) may indicate the at least one MCS along with the packet in the control channel to the base station (200).

In another embodiment, the PDSCH decoding engine (110c) may receive the at least one MCS from the list of MCS indicated in the DCI message and decode the PDSCH using the at least one MCS indicated in the DCI.

Figure 15:
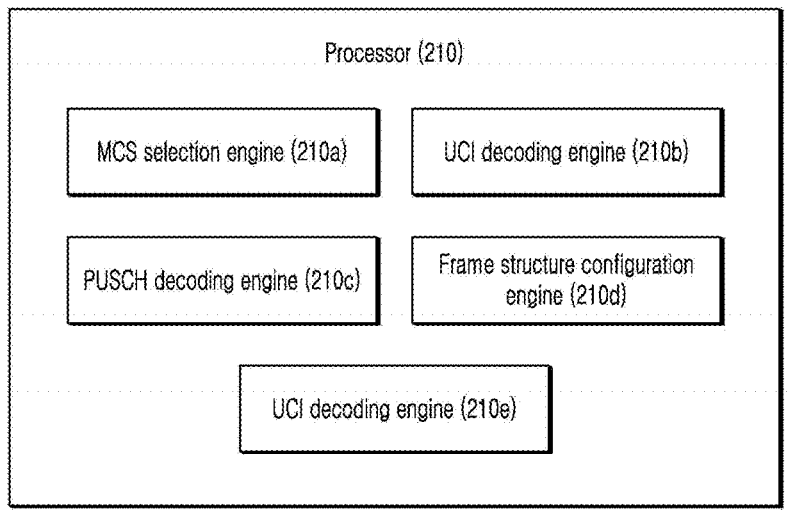
FIG. 15 illustrates various elements in a processor included in a base station, according to the embodiments as disclosed herein.

FIG. 15 illustrates various elements in the processor (210) included in the base station (200), according to the embodiments as disclosed herein. In an embodiment, the processor (210) may include a MCS selection engine (210a), a UCI decoding engine (210b), a PUSCH decoding engine (210c), a frame structure configuration engine (210d), and a guard time controlling engine (210e).

In an embodiment, the MCS selection engine (210a) may send the list of default MCS to the UE (100) and receive at least one MCS, from the list of default MCS, along with the packet in the control channel from the UE (100) using the UCI. In an embodiment, the UCI decoding engine (210b) may decode the UCI containing the at least one MCS and decode a PUSCH using the at least one decoded MCS using the PUSCH decoding engine (210c).

In an embodiment, the PUSCH decoding engine (210c) may determine that the PUSCH is not able to decode using the at least one decoded MCS and perform a fallback to the default MCS.

In an embodiment, the frame structure configuration engine (210d) may configure the frame structure based on the minimum delay associated with the cell, the maximum delay associated with the cell, differential delay associated with the cell and the slot length. Further, the guard time controlling engine (210e) may control a guard time based on the minimum delay associated with the cell, the maximum delay associated with the cell, the differential delay associated with the cell and the slot length. In an embodiment, the processor (210) may support the TDD frame based on the guard time.

Figure 16:
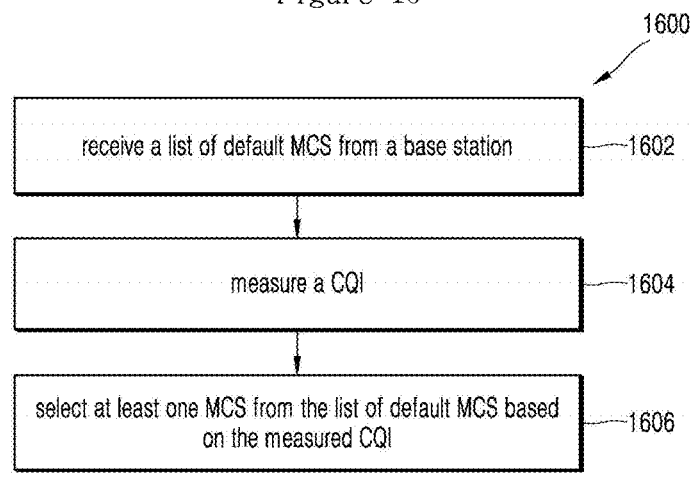
FIG. 16 is a flow chart illustrating a method for selecting the MCS in the wireless communication system from a UL perspective view, according to the embodiments as disclosed herein.

FIG. 16 is a flow chart (1600) illustrating a method for selecting the MCS in the wireless communication system (300) from the UL perspective view, according to the embodiments as disclosed herein. The operations (1602-1606) may be performed by the processor (110). At 1602, the method may include receiving the list of default MCS from the base station (200). At 1604, the method may include measuring the CQI. At 1606, the method may include selecting at least one MCS from the list of default MCS based on the measured CQI.

Figure 17:
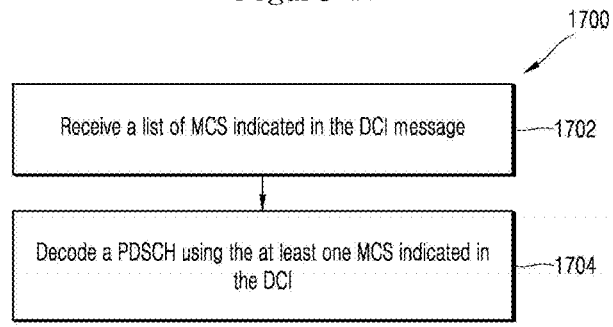
FIG. 17 is a flow chart illustrating a method for selecting the MCS in the wireless communication system from the DL perspective view, according to the embodiments as disclosed herein.

FIG. 17 is a flow chart (1700) illustrating a method for selecting the MCS in the wireless communication system from the DL perspective view, according to the embodiments as disclosed herein. The operations (1702 and 1704) may be performed by the processor (110). At 1702, method may include receiving the list of MCS indicated in the DCI message. At 1704, the method may include decoding the PDSCH using the at least one MCS indicated in the DCI.

Figure 18:
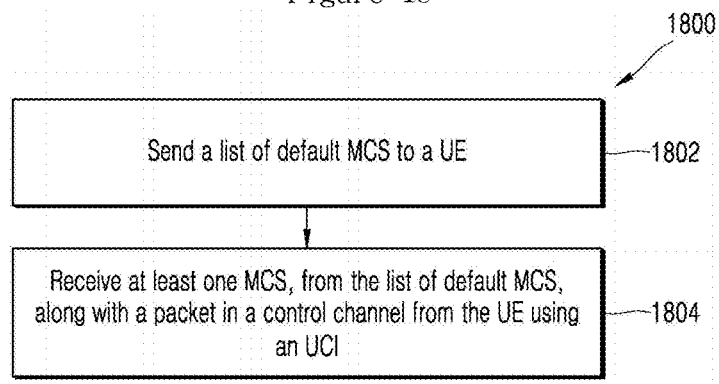
FIG. 18 is a flow chart illustrating a method for selecting the MCS in the wireless communication system from the UL perspective view, according to the embodiments as disclosed herein.

FIG. 18 is a flow chart (1800) illustrating a method for selecting the MCS in the wireless communication system (300) from the UL perspective view, according to the embodiments as disclosed herein. The operations (1802 and 1804) may be performed by the processor (210). At 1702, the method may include sending a list of default MCS to the UE (100). At 1704, the method may include receiving the at least one MCS, from the list of default MCS, along with the packet in the control channel from the UE (100) using the UCI.

Figure 19:
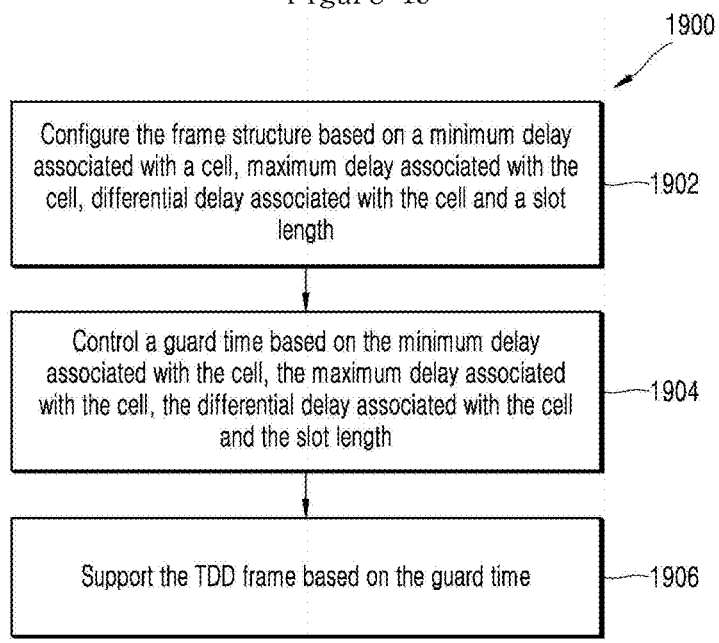
FIG. 19 is a flow chart illustrating a method for supporting the TDD frame in the high propagation delay cell using the frame structure in the wireless communication system, according to the embodiments as disclosed herein.

FIG. 19 is a flow chart (1900) illustrating a method for supporting the TDD frame in the high propagation delay cell using the frame structure in the wireless communication system (300), according to the embodiments as disclosed herein. The operations (1902-1906) may be performed by the processor (210). At 1902, the method may include configuring the frame structure based on the minimum delay associated with the cell, maximum delay associated with the cell, differential delay associated with the cell and the slot length. At 1904, the method may include controlling the guard time based on the minimum delay associated with the cell, the maximum delay associated with the cell, the differential delay associated with the cell and the slot length. At 1906, the method may include supporting the TDD frame based on the guard time.

The various actions, acts, blocks, steps, or the like in the flow charts (1600-1900) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for selecting a Modulation Coding Scheme (MCS) in a wireless communication system, the method comprising:
receiving, by a User Equipment (UE), at least one fallback/advance MCS value for each Hybrid Automatic Repeat and request (HARM) process;
receiving, by the UE, a list of default MCS in an uplink (UL) grant from a base station;
measuring, by the UE, a channel condition including a Channel Quality Indicator (CQI); and
in case that the channel condition is insufficient to use the default MCS provided in the UL grant, using MCS among the at least one fallback/advance MCS value; and
indicating the used MCS to the base station via a physical uplink shared channel (PUSCH) transmission using uplink control information (UCI).

2. The method of claim 1, further comprising:
indicating, by the UE, the used MCS along with a packet in a control channel to the base station.

3. The method of claim 1, wherein the UE does not need to indicate a first MCS back to the base station, when the UE uses the first MCS from the list of default MCS.

4. The method of claim 1, wherein the UE selects the MCS and signals an index associated with the MCS used in the UCI to the base station, if the UE determines that none of the MCS given by the base station in the default MCS list are suitable.

5. A method for selecting a Modulation Coding Scheme (MCS) in a wireless communication system, the method comprising:
sending, by a base station, at least one fallback/advance MCS value for each Hybrid Automatic Repeat and request (HARQ) process; and
sending, by the base station, a list of default MCS in an uplink (UL) grant to a User Equipment (UE);
wherein a channel condition including a Channel Quality Indicator (CQI) is measured,
wherein MCS among the at least one fallback/advance MCS value is used, in case that the channel condition is insufficient to use the default MCS provided in the UL grant, and
receiving, by the base station, the used MCS via a physical uplink shared channel (PUSCH) transmission using uplink control information (UCI).

6. The method of claim 5, further comprising:
decoding, by the base station, the UCI containing the used MCS; and
decoding, by the base station, the PUSCH using the decoded MCS.

7. The method of claim 5, wherein the base station considers that UE has used a first MCS from the list of default MCS, if the base station does not receive the MCS used from the UE.

8. The method of claim 5, wherein the base station receives an index associated with the MCS used in the UCI from the UE, if the UE determines that none of the MCS given by the base station in the default MCS list are suitable.

9. A User Equipment (UE) for selecting a Modulation Coding Scheme (MCS) in a wireless communication system, the UE comprising:
a memory; and
a processor, coupled with the memory, the processor configured to:
receive, by the UE, at least one fallback/advance MCS value for each Hybrid Automatic Repeat and request (HARQ) process;
receive, by the UE, a list of default MCS in an uplink (UL) grant from a base station;
measure, by the UE, a channel condition including a Channel Quality Indicator (CQI);
in case that the channel condition is insufficient to use the default MCS provided in the UL grant, use MCS among the at least one fallback/advance MCS value; and
indicate the used MCS to the base station via a physical uplink shared channel (PUSCH) transmission using uplink control information (UCI).

* * * * *